United States Patent [19]

Kitchin et al.

[11] 3,757,751
[45] Sept. 11, 1973

[54] AIR STREAM EXPOSED ADJUSTABLE RAM AIR INTAKE HORN

[76] Inventors: James F. Kitchin, Rt. 2; Dalton L. Smith, 310 Line Oak St., both of Marlin, Tex. 76661

[22] Filed: Jan. 7, 1972

[21] Appl. No.: 216,057

[52] U.S. Cl.................. 123/119 CG, 98/64, 98/65
[51] Int. Cl............................................. F23l 17/02
[58] Field of Search........................... 98/61, 64, 65; 123/119 CG

[56] References Cited
UNITED STATES PATENTS

| | | |
|---|---|---|
| 1,099,963 | 6/1914 | Brewer.................................. 98/64 |
| 2,785,620 | 3/1957 | Welch................................. 98/65 X |
| 1,375,422 | 4/1921 | Sherer......................... 123/119 CG |
| 1,533,344 | 4/1925 | Singleton.............................. 98/64 |

*Primary Examiner*—William F. O'Dea
*Assistant Examiner*—Peter D. Ferguson
*Attorney*—Harvey B. Jacobson

[57] ABSTRACT

An air intake horn assembly for use on the induction air intake of a vehicle combustion engine. The assembly is constructed in a manner whereby it may open horizontally in the direction in which the associated vehicle is moving to thereby support ram air induction for the associated combustion engine. However, the intake horn is constructed in a manner whereby it may be at least partially shielded from ram air in inclement weather.

2 Claims, 9 Drawing Figures

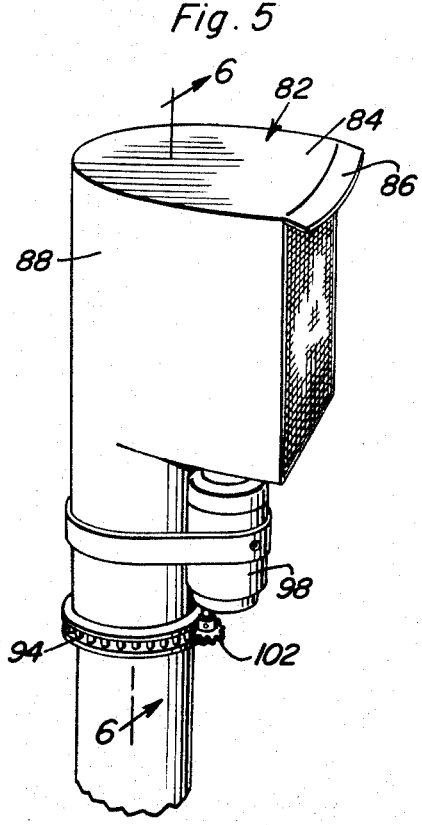
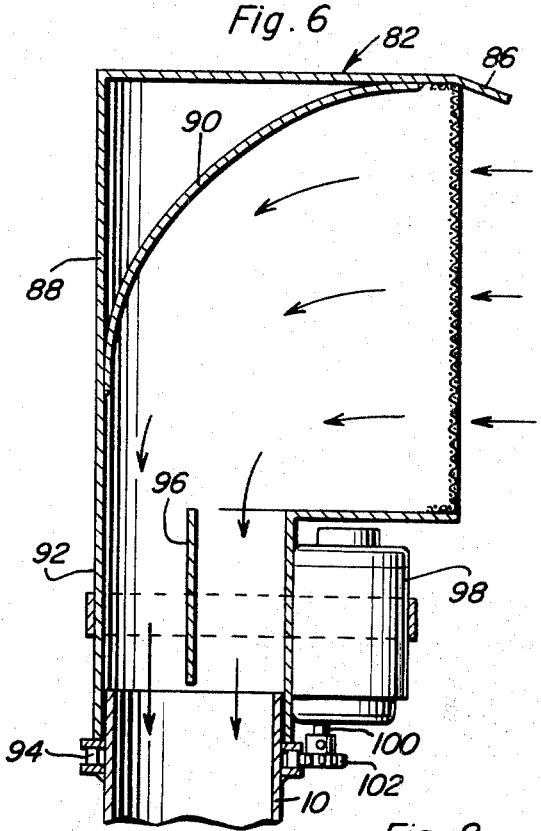
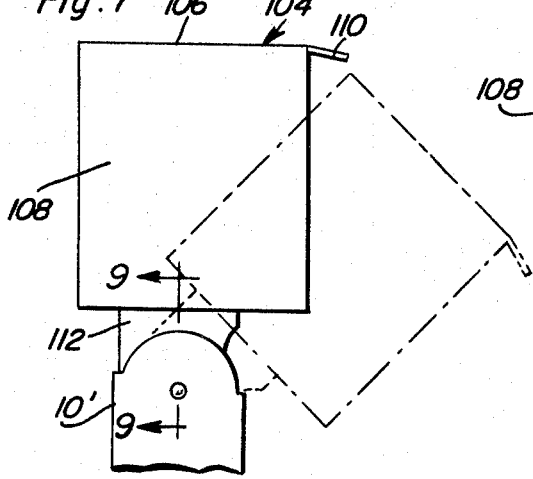
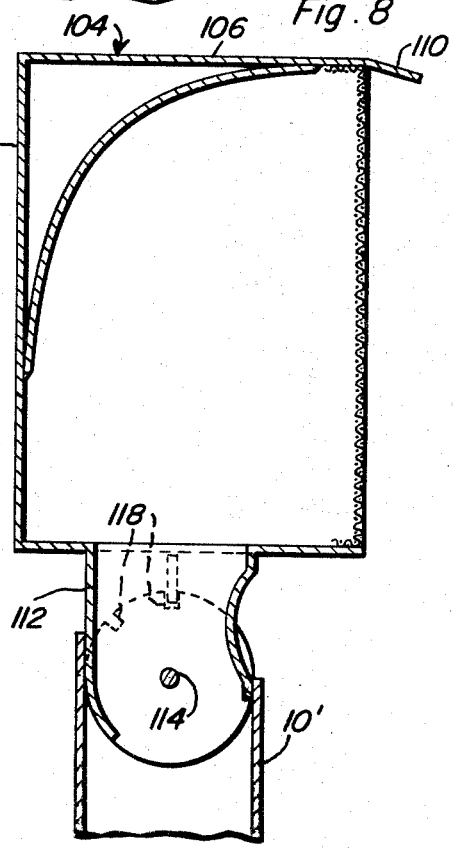
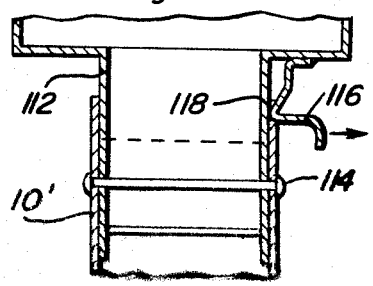

PATENTED SEP 11 1973 3,757,751

AIR STREAM EXPOSED ADJUSTABLE RAM AIR INTAKE HORN

The ram air intake horn of the instant invention has been specifically designed to provide a ram air intake for the air induction system of a vehicle combustion engine. Several forms of ram air intake horns are specifically illustrated and described hereinafter and while each form may function to afford ram air induction each has its own specific operating characteristics.

The main object of this invention is to provide structure for inducing ram air flow into the air induction system of the driving combustion engine of a moving vehicle.

Another object of this invention is to provide a ram air induction structure in accordance with the preceding object and constructed in a manner whereby the direction of the prevailing wind may automatically be compensated for so as to ensure maximum ram air induction.

Still another object of this invention is to provide a ram air induction system in accordance with the preceding objects and constructed in a manner whereby the intake for the induction system may be at least partially shielded from ram air in inclement weather.

A final object of this invention to be specifically enumerated herein is to provide a vehicle ram air induction system in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 5 is a perspective view of a third form of ram air intake horn constructed in accordance with the present invention and including a drive motor for selectively rotating the intake of the ram air horn relative to the aggregate wind direction;

FIG. 6 is an enlarged fragmentary vertical sectional view taken substantially upon the plane indicated by the section line 6—6 of FIG. 5;

FIG. 7 is a side elevational view of a fourth form of ram air intake constructed in accordance with the present invention including a selectively tiltable intake head and with an alternate tilted position of the head illustrated in phantom lines;

FIG. 8 is an enlarged fragmentary vertical sectional view taken substantially upon a plane passing through the center of the fourth form of ram air intake horn; and FIG. 9 is an enlarged fragmentary vertical sectional view taken substantially upon the plane indicated by the section line 9—9 of FIG. 7.

Referring now more specifically to the drawings, the numeral 10 generally designates an air intake pipe including an inlet end 12 and an outlet end portion 14 communicated with the air induction system (not shown) of an associated internal combustion engine of a vehicle.

Figure 1:
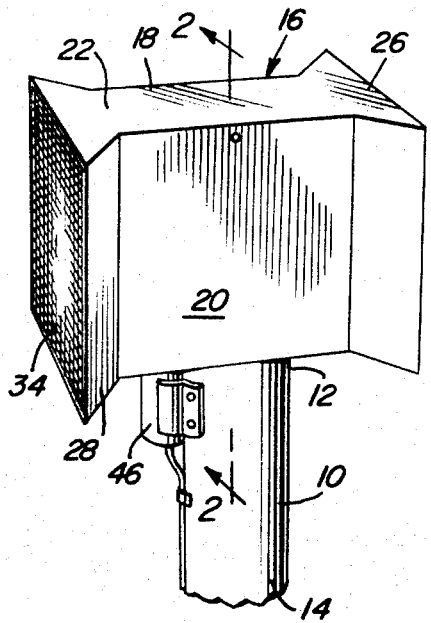
FIG. 1 is a perspective view of a first form of ram air intake constructed in accordance with the present invention.
Figure 2:
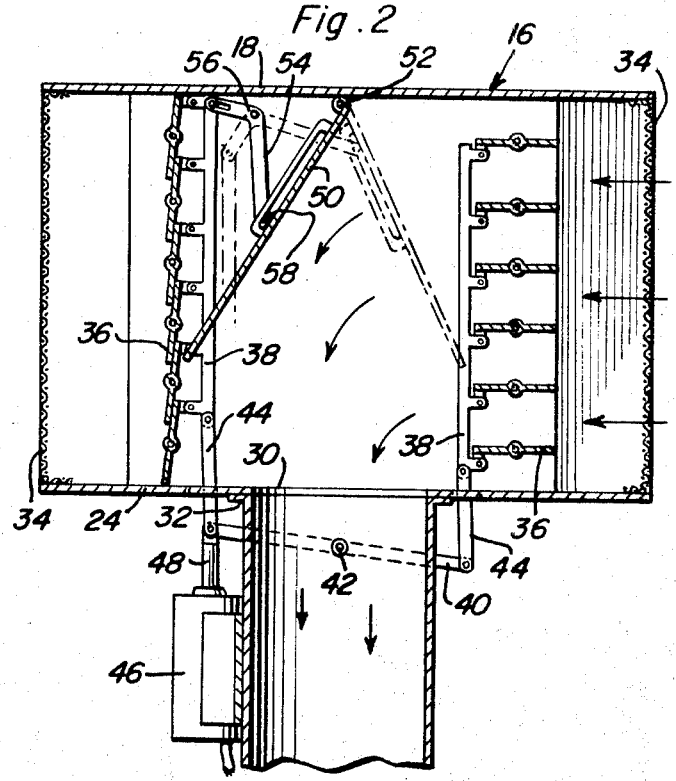
FIG. 2 is an enlarged fragmentary vertical sectional view taken substantially upon the plane indicated by the section line 2—2 of FIG. 1 and with an alternate position of an oscillatable compression vane thereof illustrated in phantom lines.

A first form of ram air intake horn constructed in accordance with the present invention is generally designated by the reference numeral 16 in FIGS. 1 and 2 of the drawings and includes a generally rectangular upstanding housing 18 having opposite side walls 20, top and bottom walls 22 and 24 and outwardly flared open opposite ends 26 and 28. The top and bottom walls 22 and 24 are secured between the upper and lower marginal edge portions, respectively, of the side walls 20 and the bottom wall 24 includes an opening 30 registered with the upper inlet end of the pipe 10, the undersurface of the bottom wall 24 about the opening 30 being secured to the flanged upper terminal end 32 of the pipe 10 in any convenient manner.

The opposite outwardly flared ends 26 and 28 have wire screens 34 secured thereover for preventing the entrance of unwanted air-borne particles into the housing 18 and each end portion of the housing 18, inwardly of the flared ends thereof, is provided with a set of horizontal louvers 36. Each set of horizontal louvers includes a vertically shiftable operating rod 38 pivotally connected to each of the corresponding louvers and an operating lever 40 is pivotally secured to the pipe 10 as at 42 centrally intermediate its opposite ends and has its terminal ends connected to the corresponding operating rods 38 by means of connecting links 44 whereby oscillation of the lever 40 between positions slightly inclined relative to the horizontal will result in one set of louvers 36 being opened and the other set of louvers being closed. Further, a double-acting solenoid 46 is secured to the pipe 10 and has its armature 48 pivotally connected to the adjacent end of the lever 40 whereby the sets of louvers 36 may be alternately closed and opened.

An upstanding compression vane 50 is pivotally secured within the upper end of the housing 18 by means of a pivot fastener 52 and a bell crank 54 is also pivotally supported within the upper end of the housing 18 by means of a pivot fastener 56. One end of the bell crank is connected to the left hand operating rod 38 in FIG. 2 by means of a pin-and-slot connection and the other end of the bell crank 54 is connected to the compression vane 50 by means of a pin-and-slot connection 58. Accordingly, it may be seen that when the right hand set of louvers 36 is open the compression vane 50 will be disposed in the solid line position thereof illustrated in FIG. 2 of the drawings in order to downwardly deflect air entering the right hand end of the housing 18 downwardly toward the upper inlet end 12 of the pipe 10. However, when the right hand set of louvers 36 is closed and the left hand set of louvers 36 is opened by oscillation of the lever 40 under the influence of the solenoid 46, the compression vane 50 is pivoted to the phantom line position thereof illustrated in FIG. 2 of the drawings so as to downwardly deflect air entering the left hand end of the housing 18 toward the upper inlet end 12 of the pipe 10.

Figure 3:
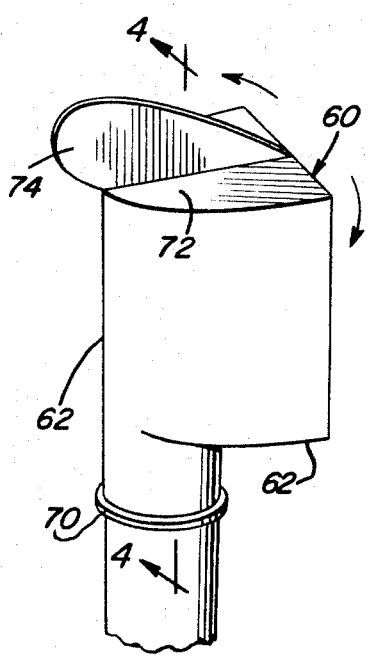
FIG. 3 is a perspective view of a wind vane-equipped rotary air intake horn comprising a second form of the instant invention.
Figure 4:
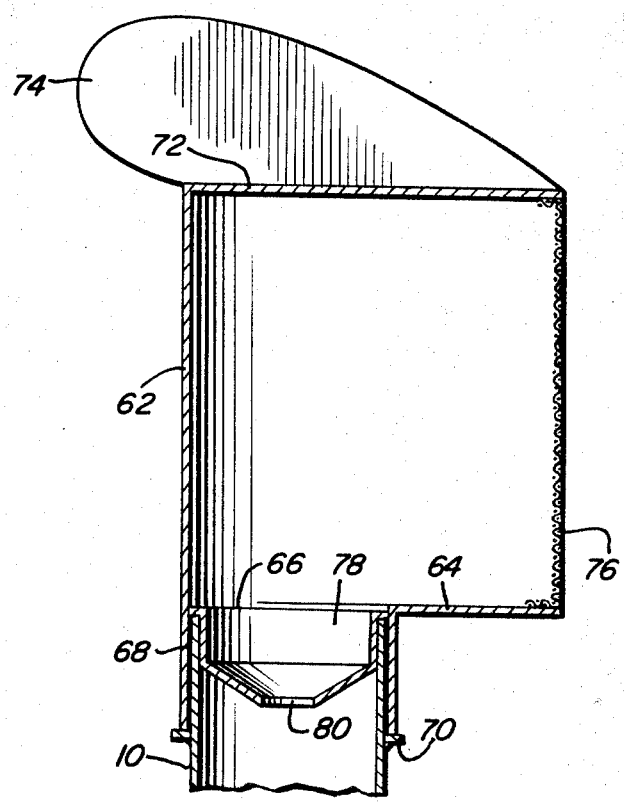
FIG. 4 is an enlarged fragmentary vertical sectional view taken substantially upon the plane indicated by the section line 4—4 of FIG. 3.

With attention now invited more specifically to FIGS. 3 and 4 of the drawings there may be seen a second form of ram air intake horn referred to in general by the reference numeral 60. The intake horn 60 likewise includes an upstanding housing 62 including a bottom wall 64. However, the bottom wall 64 has an outlet opening 66 formed therein and a depending journal sleeve 68 secured to the bottom wall 64 about the opening 66, the sleeve 68 depending downwardly from the bottom wall 64. The upper end of the inlet pipe 10 is provided with an outstanding circumferential shoulder 70 and the sleeve 68 is telescoped downwardly over the upper end of the pipe 10 and abuts the shoulder 70 whereby the horn 60 is journaled from the pipe 10. The horn 10 further includes a top wall 72 from which a wind vane 74 is supported and the front of the housing 62 is open and has a wire screen 76 secured thereover. The wind vane 74 is arranged on the top wall 72 so as to face the open side of the housing 62 into the prevailing wind. Further, a removable restrictor fitting 78 is provided and is removably seated within the upper end of the pipe 10 and has an airflow restricting opening 80 formed therethrough. The restrictor fitting 78 may or may not be utilized as desired.

With reference now more specifically to FIGS. 5 and 6 of the drawings there will be seen a third form of ram air intake horn referred to in general by the reference numeral 82. The horn 82 is quite similar in construction to the horn 60 with the exception that the upper wall 84 of the horn 82 includes a forwardly projecting and slightly downturned extension 86. Further, the rear upper portion of the interior of the housing 88 of the horn 82 includes a rearwardly and downwardly curving permanent deflector plate 90 and the depending sleeve portion 92 of the horn 82 corresponding to the sleeve 68 is somewhat greater in length than the sleeve 68 and abuts against a circumferential rack gear 94 extending about the upper end portion of the pipe 10. Also, the sleeve 92 includes a diametric flow controlling vane 96 and an electrically actuatable motor 98 is supported from the sleeve 92 and has a rotatable output shaft 100 upon which a gear wheel 102 is mounted, the gear 102 being meshed with the rack gear 94. Accordingly, the motor 98, being reversible, may be selectively actuated to adjustably rotate the housing 88 relative to the inlet pipe 10 illustrated in FIGS. 5 and 6.

With attention now invited more specifically to FIGS. 7 through 9 of the drawings, there may be seen a fourth form of ram air intake horn referred to in general by the reference numeral 104. The intake horn 104 is similar to the intake horns 60 and 82 in that it opens in only one horizontal direction. Further, the top wall 106 of the housing 108 of the horn 104 includes a forwardly projecting and slightly downwardly inclined extension 110 corresponding to the extension 86 of the horn 82. However, the depending sleeve 112 of the horn 104 corresponding to the sleeves 68 and 92 is oscillatably supported from the upper end of an intake pipe 10' corresponding to the intake pipe 10 by means of a diametric pivot fastener 114. Further, the horn 104 includes a spring keeper 116 selectively engageable in either of a pair of notches 118 formed in the upper end of the inlet pipe 10' whereby the housing 108 may be releasably retained in the upright position illustrated in FIG. 8 of the drawings or in the forwardly and downwardly inclined position illustrated in phantom lines in FIG. 7 of the drawings. Of course, when the housing 108 is forwardly and downwardly inclined in the manner illustrated by the phantom lines in FIG. 7 of the drawings, the open side of the housing 108 is at least partially shielded from horizontal ram air.

If it is desired, the ram air intake horn 104 may be rotatably supported from the pipe 10' merely by forming the upper end of the pipe 10' from which the housing 108 is oscillatably supported out of a sleeve member rotatably and telescopingly engageable over the pipe 10' in the manner in which the sleeve 68 is rotatably and telescopingly received over the upper end of the pipe 10 in FIGS. 3 and 4 of the drawings. Further, the ram air intake horn 104 could readily include the motor 98 and rack gear 94 of the assembly illustrated in FIGS. 5 and 6.

From the foregoing, it may be readily seen that the various intake horns 16, 60, 82 and 104 may be utilized to duct ram air into the air induction system of an associated combustion engine. Further, the ram air intake horns 16 and 82 may be completely shielded from ram air in inclement weather and the inlet of the horn 104 may be at least partially shielded from ram air in inclement weater.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an upstanding induction air intake pipe of a combustion engine, the upper end portion of said pipe defining the inlet end portion thereof, a ram air intake horn for said pipe mounted on the upper end thereof an opening outwardly in one horizontal direction, said horn including a downwardly opening outlet communicated with the upper end of said pipe, said horn including a gently curving interior surface for deflecting ram air entering the open portion of said horn downwardly toward said outlet of said horn, said horn outlet compris- a depending sleeve portion telescopingly and rotatably engaged with said upper end portion, said depending sleeve portion including a generally planar interior airflow controlling vane disposed lengthwise of and extending across the interior of said sleeve portion in a plane generally normal to the direction in which said horn opens, a circumferential rack gear mounted on the exterior of said upper end portion a spaced distance below the upper terminal end thereof, said sleeve portion being downwardly telescoped over said upper end portion with the lower end of said sleeve portion abutted against said rack gear for support therefrom, a drive motor supported from said sleeve portion and including a rotatable output shaft spaced laterally outwardly of and generally paralleling said upper end portion with a gear wheel mounted thereon and meshed with said rack gear.

2. The combination of claim 1 wherein said horn includes a generally horizontal top wall portion defining the upper limit of the open portion of said horn, said top wall including an outwardly projecting and downwardly inclined forward extension serving to shield the upper open portion of said horn.

* * * * *